(12) United States Patent
Shimizu

(10) Patent No.: US 7,529,608 B2
(45) Date of Patent: May 5, 2009

(54) VEHICLE DRIVE CONTROL DEVICE

(75) Inventor: Kouichi Shimizu, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 556 days.

(21) Appl. No.: 10/989,286

(22) Filed: Nov. 17, 2004

(65) Prior Publication Data

US 2005/0133285 A1   Jun. 23, 2005

(30) Foreign Application Priority Data

Dec. 19, 2003   (JP)   ............................ 2003-423436

(51) Int. Cl.
  *G06F 17/00*   (2006.01)
  *G05F 1/10*   (2006.01)
  *B60L 11/00*   (2006.01)

(52) U.S. Cl. .............................. 701/70; 701/1; 701/22; 701/75; 701/76; 701/77; 701/79; 180/65.1; 180/65.2; 180/205; 180/206; 903/902; 903/906; 903/942; 388/800; 388/806; 388/815; 388/822; 388/823; 388/825; 388/833; 388/842; 388/843; 388/848; 388/854

(58) Field of Classification Search ..................... 701/1, 701/22, 70, 75–77, 79; 180/65.1, 65.2, 205, 180/206; 903/902, 906, 942; 388/800, 806, 388/815, 822, 823, 825, 833, 842, 843, 848, 388/854

See application file for complete search history.

(56) References Cited

U.S. PATENT DOCUMENTS

| | | | |
|---|---|---|---|
| 4,739,244 A * | 4/1988 | Komurasaki et al. .......... 322/29 |
| 4,750,598 A | 6/1988 | Danno et al. | |
| 4,964,051 A * | 10/1990 | Sekozawa et al. ........... 701/102 |
| 4,973,896 A * | 11/1990 | Shiga et al. ................... 322/28 |
| 5,093,583 A * | 3/1992 | Mashino et al. ............ 307/10.1 |
| 5,428,274 A * | 6/1995 | Furutani et al. ............. 318/139 |
| 5,785,138 A | 7/1998 | Yoshida et al. | |
| 6,434,469 B1 * | 8/2002 | Shimizu et al. ............... 701/84 |
| 6,757,598 B2 * | 6/2004 | Okoshi ........................ 701/22 |
| 2001/0017225 A1 * | 8/2001 | Yamamoto et al. ......... 180/65.2 |
| 2001/0019210 A1 * | 9/2001 | Fukasaku et al. .......... 290/40 C |
| 2002/0007975 A1 * | 1/2002 | Naito et al. ................. 180/65.3 |
| 2002/0062184 A1 * | 5/2002 | Yoshino et al. ............... 701/22 |
| 2002/0087252 A1 * | 7/2002 | Shimizu et al. ............... 701/84 |
| 2003/0098185 A1 | 5/2003 | Komeda et al. | |
| 2004/0044458 A1 | 3/2004 | Kadota | |
| 2004/0163860 A1 * | 8/2004 | Matsuzaki et al. ......... 180/65.2 |

FOREIGN PATENT DOCUMENTS

| | | |
|---|---|---|
| EP | 0247626 A | 12/1987 |
| EP | 1209022 A | 5/2002 |
| JP | 2004-100718 | 4/2004 |

* cited by examiner

*Primary Examiner*—Jack W. Keith
*Assistant Examiner*—Chuong P Nguyen
(74) *Attorney, Agent, or Firm*—Global IP Counselors, LLP

(57) ABSTRACT

A drive control device is provided with a determining section and a voltage increasing section. The determining section determines if the actual acceleration is deficient in comparison with the acceleration requested by the driver or if the generator output is deficient in comparison with the acceleration requested by the driver. The voltage increasing section increases the voltage supplied to the electric generator from a vehicle mounted electric power source when the determining section determines that the actual acceleration or the generator output is deficient. As a result, the generator output deficiency is eliminated and the required motor torque is produced, thereby enabling the vehicle to start into motion appropriately in accordance with the acceleration requested by the driver.

15 Claims, 13 Drawing Sheets

US 7,529,608 B2

VEHICLE DRIVE CONTROL DEVICE

BACKGROUND OF THE INVENTION

1. Field of the Invention

The present invention relates to a vehicle drive control device for a vehicle. More particularly, the present invention relates to a vehicle drive control device provided with an electric generator and a voltage increasing circuit for eliminating generator output deficiencies when they occur.

2. Background Information

In hybrid vehicles driven with both an engine and a motor, the generator output and, thus, the electric power supplied to the motor is often deficient when the rotational speed of the engine is slow, such as when the vehicle is starting into motion from a stopped condition. A typical example is when the vehicle is starting into motion on an upward slope (other examples include starting into motion on a muddy road, a sandy road, or a snowy road) and the electric generator cannot generate sufficient electricity because the engine speed is low. In such a case, the vehicle may not start into motion appropriately in accordance with the acceleration requested by the driver.

In U.S. patent application Publication No. 2004/0044458 (based on Japanese Patent Application No. 2002-259160), a vehicle driving force control apparatus is disclosed whereby generator output deficiencies are eliminated by increasing the engine rotational speed in a four-wheel drive system employing an electric generator and an electric motor. Since the electric generator is driven by the engine, it cannot generate sufficient electricity if the engine rotational speed is low. Therefore, the vehicle driving force control apparatus was configured to prevent the generator output from declining by maintaining a high engine rotational speed without upshifting the gear ratio of the transmission.

In view of the above, it will be apparent to those skilled in the art from this disclosure that there exists a need for an improved vehicle drive control device. This invention addresses this need in the art as well as other needs, which will become apparent to those skilled in the art from this disclosure.

SUMMARY OF THE INVENTION

It has been discovered that in the above-mentioned technology that the generator output can prevent the generator output from declining when the vehicle speed has risen to some degree and the transmission has shifted to second gear or higher, but it is not effective when the vehicle is first starting into motion and the engine rotational speed is low. One feasible method of increasing the generator output at low rotational speeds is to increase the size of the electric generator and increase the number and/or size of the magnets, but this approach has drawbacks. Namely, if the electric generator is too large, it will not fit into the engine compartment. Additionally, increasing the quantity of magnets results in a higher cost.

The present invention was conceived in view of these problems. One object of the present invention is to provide a vehicle drive control device (generator output deficiency eliminating device) that can resolve the aforementioned drawbacks of the prior art.

In view of the foregoing, a vehicle drive control device is provided that basically comprises a determining section and a generator voltage increasing section. The determining section is configured to determine if an actual vehicle acceleration is deficient in comparison with a requested acceleration amount based on an acceleration operation by a driver. The generator voltage increasing section is configured to increase supply of a field coil voltage of an electric generator upon a determination by the determining section that the actual vehicle acceleration is deficient in comparison with the requested acceleration amount.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
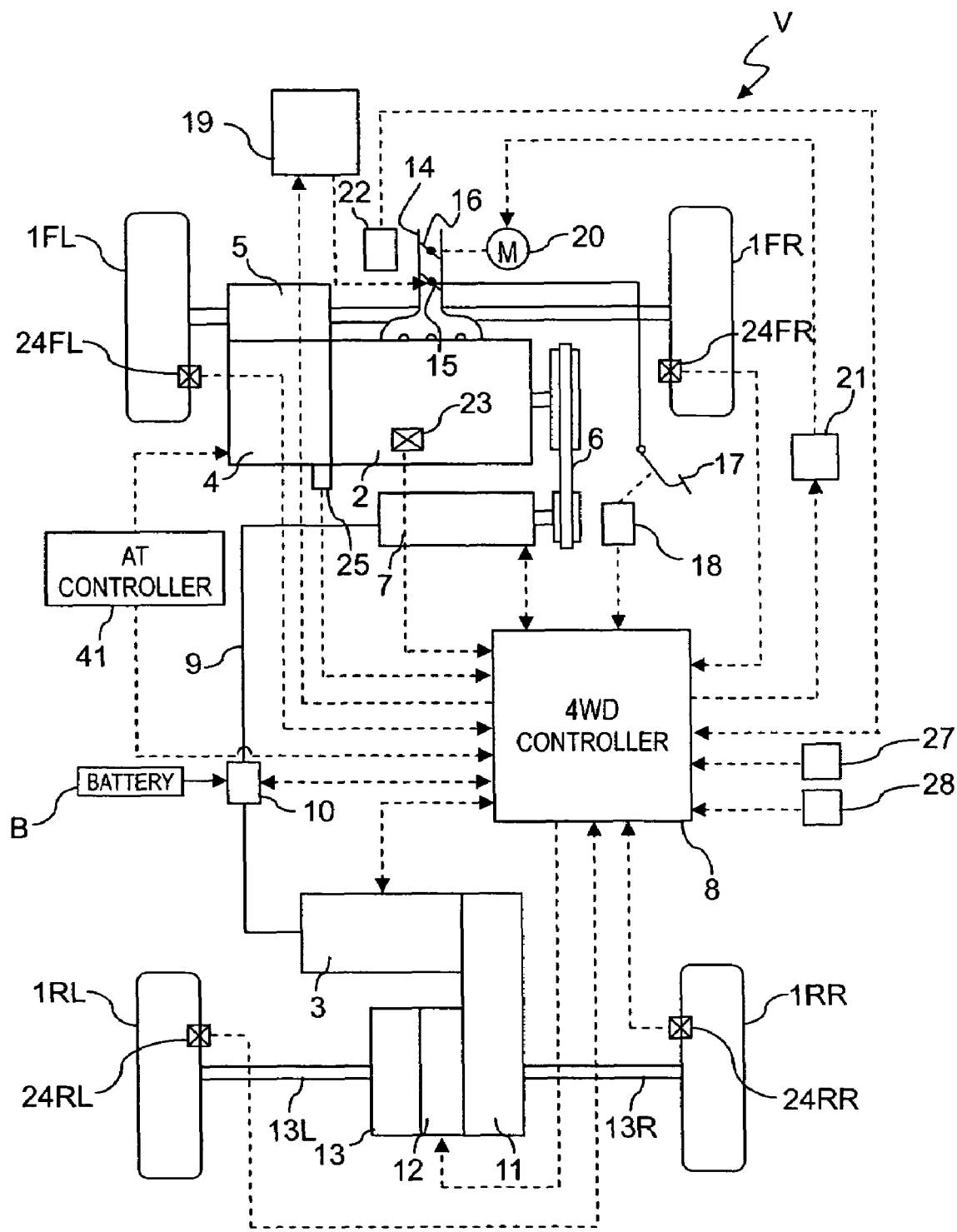
FIG. 1 is a schematic block diagram of a four-wheel drive vehicle equipped with an electric generator and a vehicle drive control device in accordance with preferred embodiments of the present invention.
Figure 2:
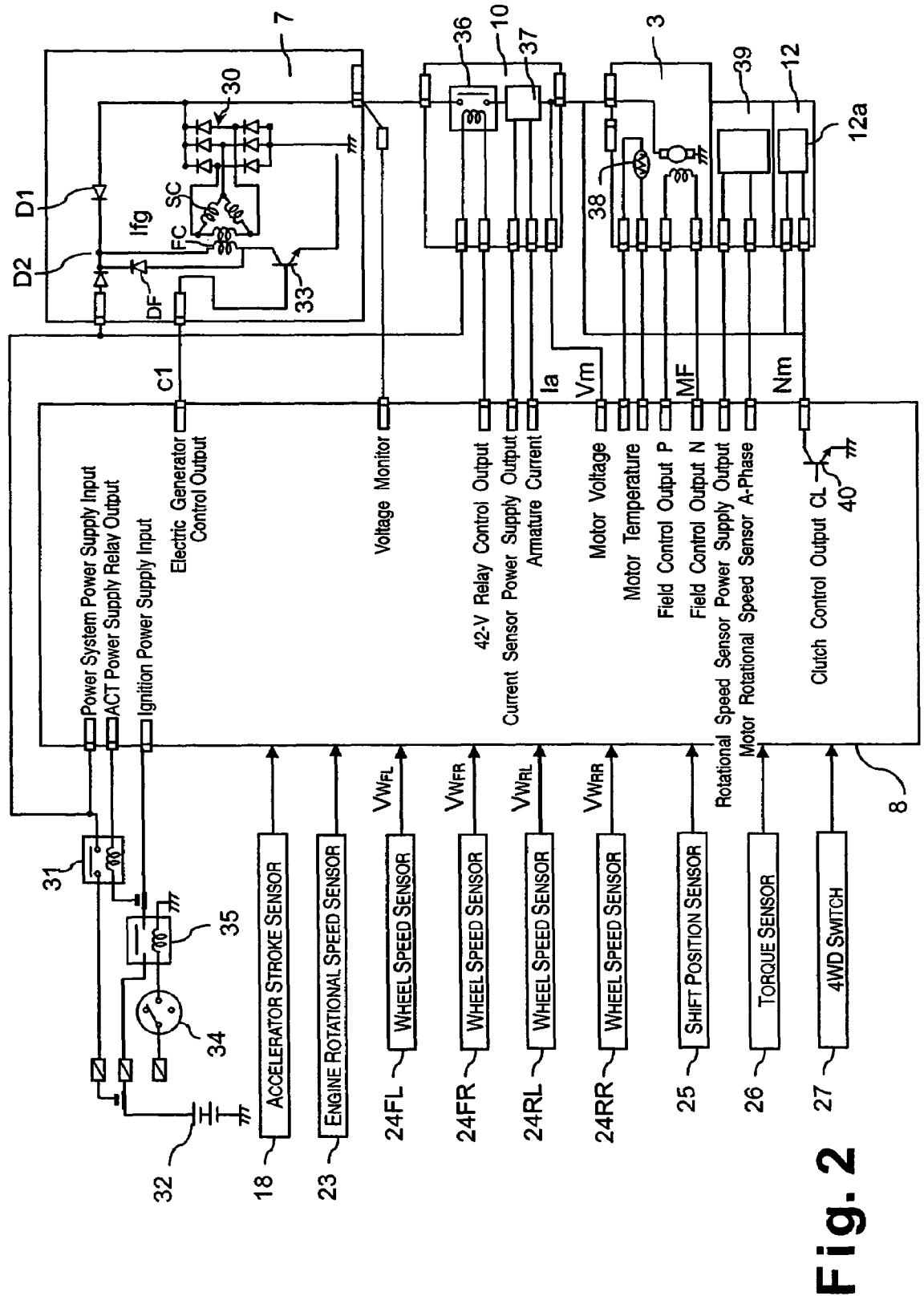
FIG. 2 is a block diagram showing a control system configuration for the four-wheel drive equipped with the vehicle drive control device illustrated in FIG. 1 in accordance with the illustrated embodiments of the present invention.

Referring initially to FIGS. 1 and 2, a vehicle driving force control apparatus will now be explained in accordance with a first embodiment of the present invention. As seen in FIG. 1, a four wheel drive vehicle V is diagrammatically illustrated that is equipped with an electric generator and drive control device in accordance with the present invention. As shown in FIG. 1, the vehicle V in accordance with this embodiment has left and right front wheels 1FL and 1FR that are driven by an internal combustion engine or main drive source 2, and left and right rear wheels 1RL and 1RR that are driven by a DC electric motor or subordinate drive source 3. Thus, the front wheels 1FL and 1FR serve as the main drive wheels, while the rear wheels 1RL and 1RR serve as the subordinate drive wheels. The output torque Te of the engine 2 is delivered to the left and right front wheels 1FL and 1FR after passing through an automatic transmission 4 and a differential gear 5. An endless drive belt 6 transfers power from the internal combustion engine 2 to an electric generator 7, which supplies electrical energy to the DC electric motor 3. Thus, a portion of the output torque Te of the engine 2 is delivered to the electric generator 7 by the endless drive belt 6. In other words, the generator 7 is rotated at a rotational speed Ng, which is obtained by multiplying the rotational speed Ne of the engine 2 by the pulley ratio of the endless drive belt 6. The electric generator 7 imposes a load on the engine 2 in accordance with the field current Ifg, which is regulated by a 4WD controller 8. The electric generator 7 generates a quantity of electric power corresponding to the load torque it imposes on the engine 2. A battery (vehicle electric power source) B is also configured and arranged to supply electric power to the DC electric motor 3 and the electric generator 7.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The electric power generated by the electric generator 7 is delivered to the DC electric motor 3 through an electrical wire 9 and a junction box 10. The output shaft of the DC electric motor 3 is connected to a reduction gear 11, an electromagnetic clutch 12, and a differential gear 13. The left and right output sides of the differential gear 13 are connected to the left and rear wheels 1RL and 1RR through drive axles 13L and 13R.

The internal combustion engine 2 has an air intake passage 14 (e.g., the intake manifold) that includes a main throttle valve 15 and a subordinate throttle valve 16. The throttle opening of the main throttle valve 15 is adjusted/controlled in accordance with the amount of depression of the accelerator pedal 17. In particular, an accelerator sensor 18 is arranged and configured to detect the depression amount of the accelerator pedal 17. The depression amount detection value from the accelerator sensor 18 is outputted as a control signal to the 4WD controller 8. The accelerator pedal 17 constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by the engine controller 19 in accordance with depression amount detection value from the accelerator sensor 18 that detects the depression amount of the accelerator pedal 17. The accelerator sensor 18 constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The subordinate throttle valve 16 uses a stepper motor 20 as an actuator for adjusting its throttle opening. Specifically, the throttle opening of the subordinate throttle valve 16 is adjusted/controlled by the rotational angle of the stepper motor 20, which corresponds to the step count. The rotational angle of the stepper motor 20 is adjusted/controlled by a drive signal from a motor controller 21. The subordinate throttle valve 16 is provided with a throttle sensor 22 as shown in FIG. 2. The step count of the stepper motor 20 is feedback-controlled based on the throttle opening detection value detected by this throttle sensor 22. The output torque of the internal combustion engine 2 can be controlled (reduced) independently of the driver's operation of the accelerator pedal 17 by adjusting the throttle opening of the subordinate throttle valve 16 so as to be smaller than the throttle opening of the main throttle valve 15.

The vehicle drive control device is also equipped with an engine rotational speed sensor 23, a plurality of wheel speed sensors 24FL, 24FR, 24RL and 24RR, a shift or gear position sensor 25 (gear ratio detecting device) and a torque sensor 26. The engine rotational speed sensor 23 is configured and arranged to detect the rotational speed Ne of the internal combustion engine 2. The engine rotational speed sensor 23 outputs control signals that are indicative of the engine rotational speed Ne to the 4WD controller 8. The wheel speed sensors 24FL, 24FR, 24RL, 24RR are provided on the wheels 1FL, 1FR, 1RL and 1RR, respectively. Each wheel speed sensor 24FL, 24FR, 24RL and 24RR is configured and arranged to detect a wheel speed, and sends the respective detected wheel speed VwFL, VwFR, VwRL, VwRR to the 4WD controller 8. The shift or gear position sensor 25 is configured and arranged to detect the shift position (the current shift range or gear position) of the automatic transmission 4. The shift or gear position sensor 25 sends a signal indicating the detected shift position to a 4WD controller 8. The transmission 4 executes gear shifting in response to a shift command from a transmission control unit (not shown in the drawings). The transmission control unit holds tables or the like containing information describing the shift schedule of the transmission based on the vehicle speed and the accelerator position. When it determines that the vehicle will pass through a shift point based on the current vehicle speed and accelerator position, the transmission control unit issues a shift command to the transmission.

The torque sensor 26 is configured and arranged to detect the drive torque delivered to the front wheels from the output side of the automatic transmission 4. The shift position detected by the shift position sensor 25 and the front wheel drive torque TF detected by the torque sensor 26 are fed to the 4WD controller 8.

A 4WD switch 27 is provided near the driver's seat for selecting whether or not to use four-wheel drive mode. The switch signal from the 4WD switch is also fed to the 4WD controller 8.

As shown in FIG. 2, the electric generator 7 has a three-phase delta-connected stator coil SC and a field coil FC and each of the connection nodes of the stator coil SC is connected to a regulator circuit 30 made up of diodes. The generator 7 is configured to deliver a maximum DC output voltage VG of, for example, 42 volts. One end of the field coil FC is connected to the regulator circuit 30 through a diode D1 and to a battery 32 having a prescribed voltage (e.g., 12 volts) through a diode D2 oriented in the reverse bias direction and a 4WD relay 31. The other end of the field coil FC is connected to the cathode sides of the diodes D1 and D2 through a flywheel diode DF oriented in the forward bias direction and to ground through a bipolar transistor 33 that constitutes a voltage regulator.

The portion of the generator circuit configured to supply a field current Ifg via the regulator circuit 30 and the diode D1 constitutes a self-exciting circuit and the portion of the generator circuit configured to supply a field current Ifg via the battery 32 and the diode D2 constitutes a separate exciting circuit. The diodes D1 and D2 serve as a "select high" section that functions to select the higher of the voltages supplied by the self-exciting circuit and the separate exciting circuit.

One end of the relay coil of the 4WD relay 31 is connected to the output side of an ignition relay 35 that is connected to the battery 32 through an ignition switch 34 and the other end of the relay coil of the 4WD relay 31 is connected to the 4WD controller 8.

The 4WD controller 8 controls the generator load torque Tg imposed on the engine 2 by the electric generator 7 and the output voltage VG generated by the electric generator 7 by adjusting the field current Ifg flowing through the field coil (generator field coil) FC. The bipolar transistor 33 receives a pulse width modulated (PWM) generator control command (field current value) C1 from the 4WD controller 8 and adjusts the field current Ifg of the electric generator 7 in accordance with the generator control command C1.

A motor relay 36 and a current sensor 37 are connected in series and arranged inside the junction box 10. The motor relay 36 functions to connect and disconnect the supply of electric power to the DC electric motor 3 in accordance with a command from the 4WD controller 8. The current sensor 37 detects the armature current Ia supplied to the DC electric motor 3 from the electric generator 7 and sends a signal indicating the detected armature current Ia to the 4WD controller 8. The 4WD controller 8 also detects the motor voltage Vm supplied to the DC electric motor 3.

The field current Ifm of the DC electric motor 3 is controlled by a pulse width modulated field control command that is issued from the 4WD controller 8 and serves as a motor output torque command. The drive torque Tm is thus adjusted by adjusting the field current Ifm. A thermistor 38 detects the temperature of the DC motor and feeds the detected temperature value to the 4WD controller 8. A motor rotational speed sensor 39 serving as an electric motor rotational speed detecting section detects the rotational speed Nm of the output shaft of the DC electric motor 3 and feeds the detected rotational speed Nm to the 4WD controller 8.

The electromagnetic clutch 12 has an excitation coil 12a, one end of which is connected to the output side of the 4WD relay 21 and the other end of which is connected the 4WD controller 8 and grounded through a switching transistor 40 that serves as a switching device inside the 4WD controller 8. A pulse width modulated clutch control command CL is fed to the base of the transistor 40 and serves to control the current in the excitation coil 12a, thereby controlling the torque transmitted to the rear wheels 1RL, 1RR (subordinate drive wheels) from the DC electric motor 3.

Figure 3:
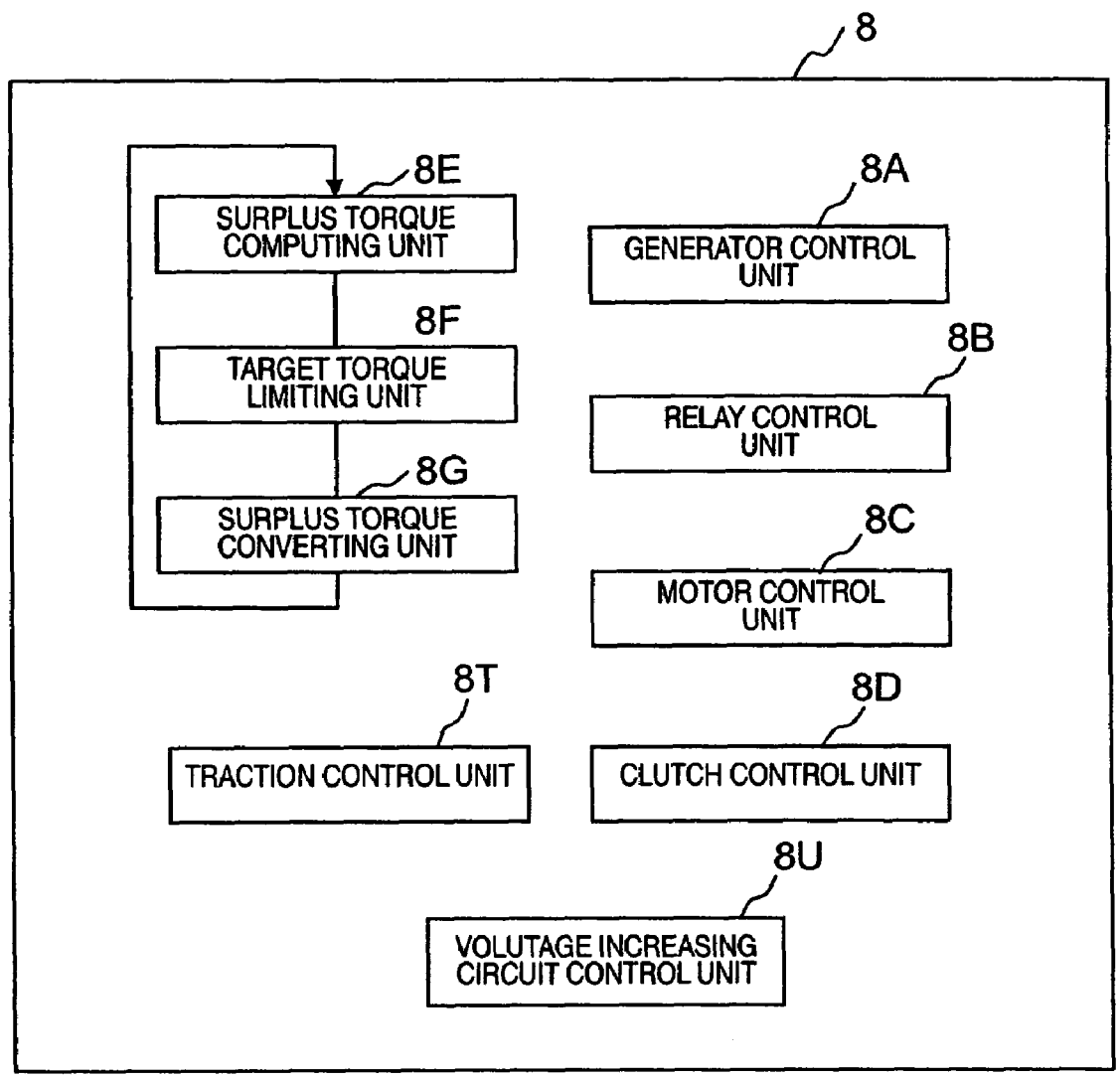
FIG. 3 is a block diagram showing the drive control device (4WD controller) of the four-wheel drive vehicle illustrated in FIG. 1 in accordance with the illustrated preferred embodiments of the present invention.

It is preferred that the vehicle drive control device in accordance with the present invention be built into the 4WD controller 8 or the like. For example, as shown in FIG. 3, the 4WD controller 8 includes a drive control device for the four-wheel drive vehicle V that is equipped with the motor 3 and generator 7. The 4WD controller 8 basically includes a generator control section or unit 8A (including acceleration computing section, actual acceleration detecting section and generator output computing section), a relay control section or unit 8B, a motor control section or unit 8C, a clutch control section or unit 8D, a surplus torque computing section or unit 8E, a target torque limiting section or unit 8F, a surplus torque converting section or unit 8G, a traction control section or unit 8T, and a voltage increasing control section or unit 8U (including determining section and voltage increasing section). The generator control unit 8A and the increasing control unit 8U constitute a vehicle drive control device 120 in accordance with the present invention.

Figure 4:
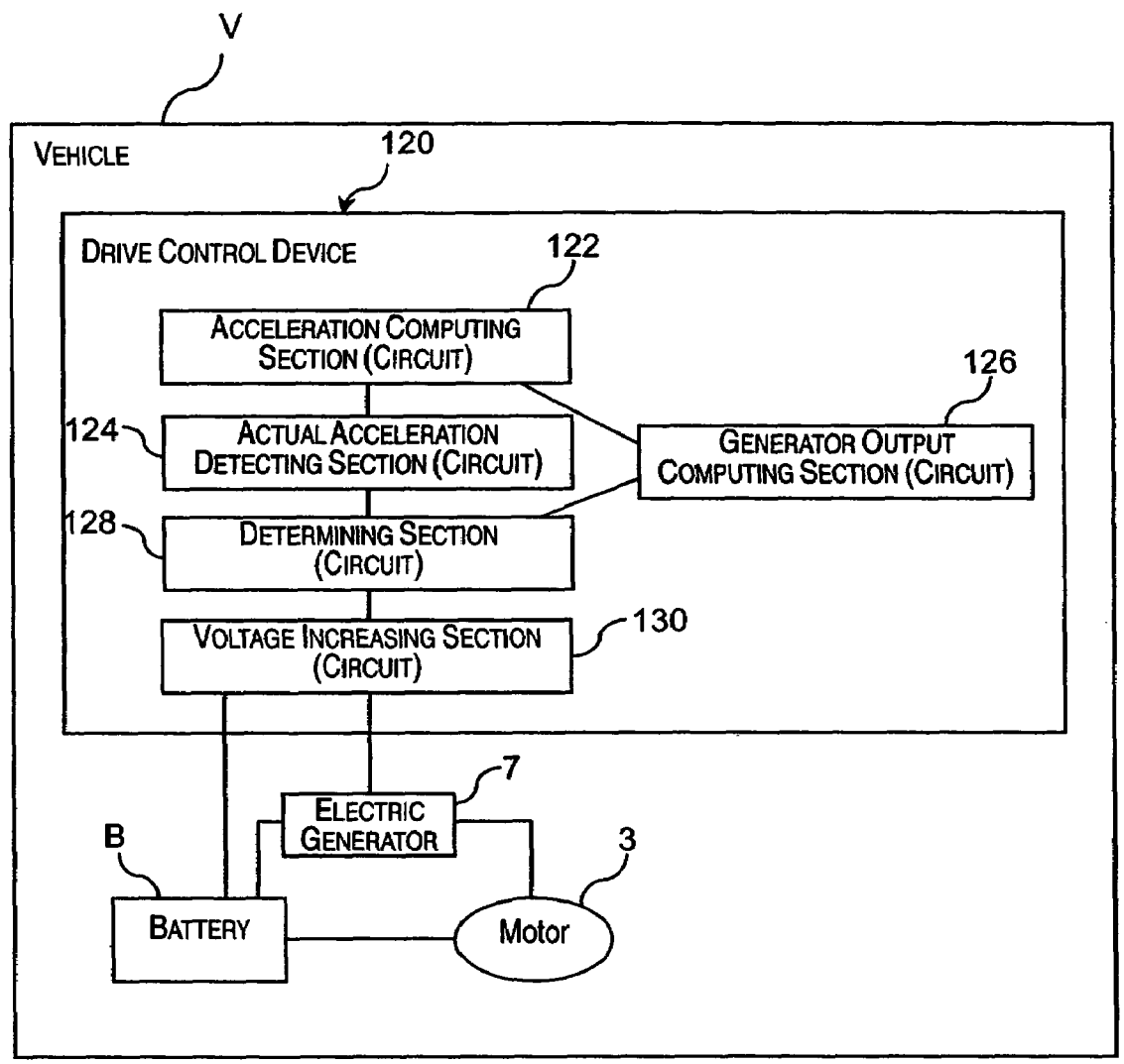
FIG. 4 is a block diagram summarizing the basic components of a vehicle drive control device in accordance with an embodiment of the present invention.

FIG. 4 is a block diagram showing the basic components of the vehicle drive control device 120 in accordance with an embodiment of the present invention. As shown in FIG. 4, the drive control device 120 is provided with an acceleration computing section (circuit) 122, an actual acceleration detecting section (circuit) 124, a generator output computing section (circuit) 126, a determining section (circuit) 128, and a voltage increasing section (circuit) 130.

The acceleration computing section 122 computes the acceleration requested by the driver based on the accelerator position. The actual acceleration detecting section 124 detects (or computes) the actual acceleration of the vehicle based on a signal from an acceleration sensor 28 or based on wheel speed as explained below. The generator output computing section 126 computes the target motor torque based on the acceleration requested by the driver and then computes the generator output corresponding to the target motor torque. The determining section 128 determines if the actual acceleration is deficient in comparison with the acceleration requested by the driver or if the generator output is deficient in comparison with the acceleration requested by the driver. The voltage increasing section 130 increases the voltage supplied to the electric generator 7 from the battery (vehicle mounted electric power source) B when the determining section 128 determines that the actual acceleration or the generator output is deficient. As a result, the generator output deficiency is eliminated and the required motor torque is produced, thereby enabling the vehicle to start into motion appropriately in accordance with the acceleration requested by the driver The processing executed by the 4WD controller 8 will now be described for a case in which the vehicle drive control device in accordance with the present invention has been built into the vehicle shown in FIG. 1.

Figure 5:
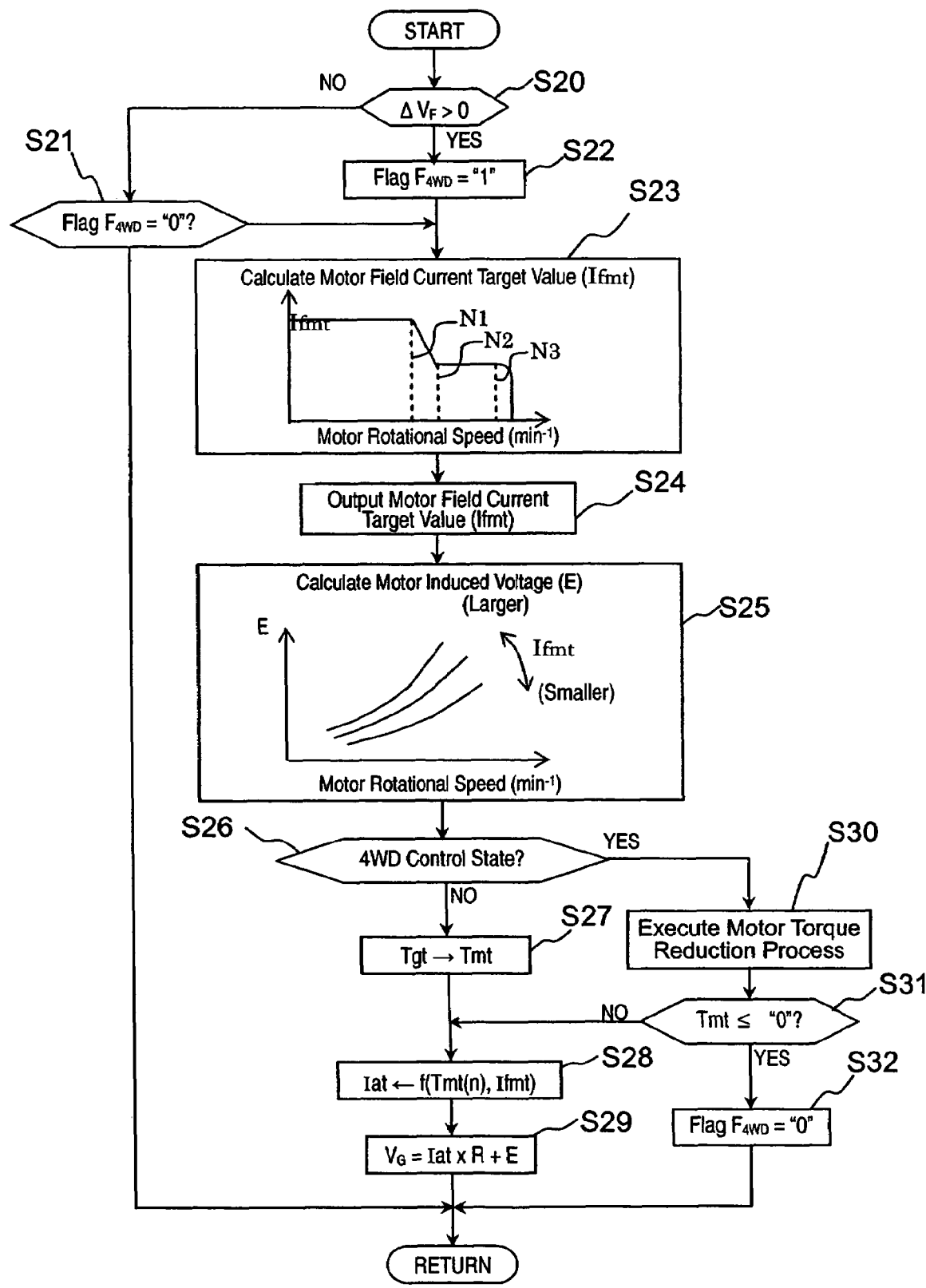
FIG. 5 is a flow chart showing an example of the processing sequence executed by the 4WD controller for the vehicle illustrated in FIG. 1 in accordance with the illustrated embodiments of the present invention.

FIG. 5 is a flowchart presenting an example of the processing executed by the surplus torque converting section 8G of the 4WD controller 8 that is used in a vehicle equipped as shown in FIG. 1.

First, in step S20, the 4WD controller 8 determines if the vehicle is experiencing acceleration slippage by determining if the slippage speed $\Delta V_F$ is larger than zero. If the slippage speed $\Delta V_F$ is determined to be larger than zero, then the 4WD controller 8 proceeds to step S22 because the front wheels 1FL and 1FR are experiencing acceleration slippage. If the 4WD controller 8 determines that the slippage speed $\Delta V_F$ is less than or equal to zero, then the 4WD controller 8 does not proceed to step S21 because the front wheels 1FL and 1FR are not experiencing acceleration slippage.

In step S21, a determination is made as to whether or not the vehicle is in a four wheel drive state by checking if the operating flag $F_{4WD}$ is set to "0". In other words, the 4WD controller 8 determines if the operation flag $F_{4WD}$ that indicates whether or not the vehicle is in four-wheel drive mode with the electric motor 3 running has been reset to "0". When the operating flag $F_{4WD}$ is set to "0", this represents that the electric motor 4 is not driven and the vehicle is in a two-wheel drive state. If the operation flag $F_{4WD}$ has been reset to "0", then the 4WD controller 8 ends the processing sequence without executing the surplus torque converting processing and returns to the processing of the surplus torque computing unit 8E. If the operation flag $F_{4WD}$ has a value of "1", then the 4WD controller 8 proceeds to step S23 (discussed later).

Meanwhile, if the slippage velocity $\Delta V_F$ is determined to be greater than 0 in step S20, the front wheels 1FL and 1FR are deemed to be undergoing acceleration slippage and the 4WD controller 8 proceeds to step S22.

In contrast, when the result of the determination of step S20 is the slippage speed $\Delta V_F$ is determined to be larger than zero, the determination is that the front wheels 1FL and 1FR are experiencing acceleration slippage and the process proceeds to step S22. In step S22, the operating flag $F_{4WD}$ is set to "1", and the process proceeds to step S23.

In step S23, the 4WD controller 8 reads in the rotational speed Nm of the DC electric motor 3 detected by the motor rotational speed sensor 39 and calculates the target motor field current value Ifmt by referring to a target motor field current value calculation map using the rotational speed Nm of the DC electric motor 3. Thus, the motor field current target value Ifmt is computed referencing the motor field current target value calculation map shown in step S23 of FIG. 5.

The target motor field current calculation map has a characteristic curve L1 created based on the first gear of the drive range (D) of the automatic transmission 4, which is the gear with the highest gear ratio in that range. The horizontal axis of the map indicates the motor rotational speed Nm and the vertical axis indicates the target motor field current value Ifmt. During the period from when the motor rotational speed Nm is 0 until a first prescribed value N1 is reached, the target motor field current value Ifmt is held at a preset maximum current value Imax. When the motor rotational speed Nm exceeds the first prescribed value N1, the target motor field current value Ifmt is decreased along a comparatively large slope until the motor rotational speed Nm reaches a second prescribed value N2 that is larger than the first prescribed value N1. When the motor rotational speed Nm is between the second prescribed value N2 and a third prescribed value N3 that is larger than the second prescribed value N2, the target motor field current target value Ifmt is held at a low current value $I_L$ that is lower than the initial current value $I_{IN}$. When the motor rotational speed Nm exceeds the third prescribed value N3, the target motor field current value Ifmt is reduced along an even larger slope until it reaches 0.

The target motor field current value Ifmt is held at a fixed current value $I_{MAX}$ with respect to the motor rotational speed Nm when the rotational speed Nm is between 0 and a prescribed value N1. When the rotational speed Nm exceeds the prescribed rotational speed value N1, the field current Ifm of the DC electric motor 3 is reduced using a well-known weak field control method. More specifically, when the rotational speed of the DC electric motor 3 becomes high, the induced voltage E in the DC electric motor 3 increases and the motor torque declines. Thus, when the rotational speed Nm of the DC electric motor 3 exceeds the prescribed value N1, the field current Ifm of the DC electric motor 3 is reduced in order to reduce the induced voltage E and thereby increase the current flowing to the DC electric motor 3 in order to obtain the required motor torque Tm. As a result, even if the rotational speed of the DC electric motor 3 becomes high, the required motor torque Tm can be obtained because the induced voltage E is kept from increasing so that the motor torque is kept from declining. Since the motor field current Ifm is controlled in two stages, i.e., one field current is used for rotational speeds below a prescribed rotational speed and another field current is used for rotational speeds equal to or above a prescribed rotational speed, the electronic circuitry can be make less expensive than in a case where the field current is controlled on a continuous basis.

Next, the process proceeds to step S24. In this step, the motor field current target value Ifmt computed in step S23 is output by the 4WD controller 8 to the motor control section 8C and the process proceeds to step S25.

Next, the process proceeds to step S25. In step S25, the 4WD controller 8 calculates the motor induced voltage E based on the motor rotational speed Nm and the motor field current target value Ifmt calculated in step S23 using the motor induced voltage calculation map shown in FIG. 5. The motor induced voltage calculation map is configured such that curves for different motor field current target values Ifmt are plotted on a graph having the motor rotational speed Nm on the horizontal axis and the motor induced voltage E on the vertical axis. The characteristic curve used depends on the target motor field current value Ifmt. The characteristic curves are configured such that the motor induced voltage E increases substantially linearly as the motor rotational speed Nm increases, and the motor induced voltage E also increases as the motor field current target value Ifmt increases.

Next, the process proceeds to step S26. In this step a determination is made as to whether or not a four-wheel drive state is established, e.g., if a four-wheel drive termination condition is satisfied. As an example, this determination determines whether or not the last motor torque target value Tmt(n-1) is equal to or less than the previously set motor torque threshold value $Tm_{TH}$. When the last motor torque target value Tmt(n-1) greater than less than the previously set motor torque threshold value $Tm_{TH}$, the determination is that a four-wheel drive state is not established (the four-wheel drive termination condition is not satisfied) and the process proceeds to step S27. When the last motor torque target value Tmt(n-1) less than the previously set motor torque threshold value $Tm_{TH}$, the determination by the 4WD controller 8 is that a four-wheel drive state is established (the four-wheel drive termination condition is satisfied) and the process proceeds to step S30.

In step S27, the 4WD controller 8 calculates the target motor torque value Tmt corresponding to the target generator load torque value Tgt calculated by the surplus torque computing section 8E and proceeds to step S28.

In step S28, the 4WD controller 8 calculates the target armature current value Iat corresponding to the target motor torque value Tmt and the target motor field current value Ifmt using a prescribed target armature current value calculating map. The horizontal axis of the map indicates the target motor torque value Tmt and the vertical axis indicates the target armature current value Iat. The characteristic curve used depends on the target motor field current value Ifmt. The characteristic curves are configured such that when the motor output torque Tm is zero, the target armature current value Iat is zero regardless of the target motor field current value Ifmt. As the motor output torque Tm increases the armature current target value Iat increases, but as the motor field current target value Ifmt increases the armature current target value Iat decreases. When the motor output torque Tmt becomes larger, the armature current target values Iat go to zero sequentially in order from the smallest motor field current target value Ifmt.

Next, the process proceeds to step S29. In step S29, after computing the armature current target value Iat in the prior step, the 4WD controller 8 calculates the target voltage value $V_G$ of the electric generator 7 based on the target armature current value Iat, the combined resistance R of the electrical wire 9 and the coil of the DC electric motor 3, and the induced voltage E using the following Equation (1):

$$V_G = Iat \times R + E \tag{1}$$

After the target voltage value $V_G$ of the electric generator 7 is sent to the generator control unit, the 4WD controller 8 ends the processing sequence and returns to the processing of the surplus torque computing unit 8E.

Meanwhile, in step S30, the 4WD controller 8 executes motor torque reduction processing whereby it reduces the target motor torque value Tmt (n-1) of the previous cycle by a prescribed amount ΔTmt to calculate the target motor torque value Tm(n) of the current cycle: Tm(n)=Tmt(n-1)-ΔTmt.

In step S31, the 4WD controller 8 determines if the target motor torque value Tmt (n) is 0 or below. If the target motor torque value Tm(n) is greater than 0, then the 4WD controller 8 proceeds to step S28. If the target motor torque value Tm(n) is equal to or less than "0", then the 4WD controller 8 proceeds to step S32 where it resets the operation flag $F_{4WD}$ to "0".

Figure 6:
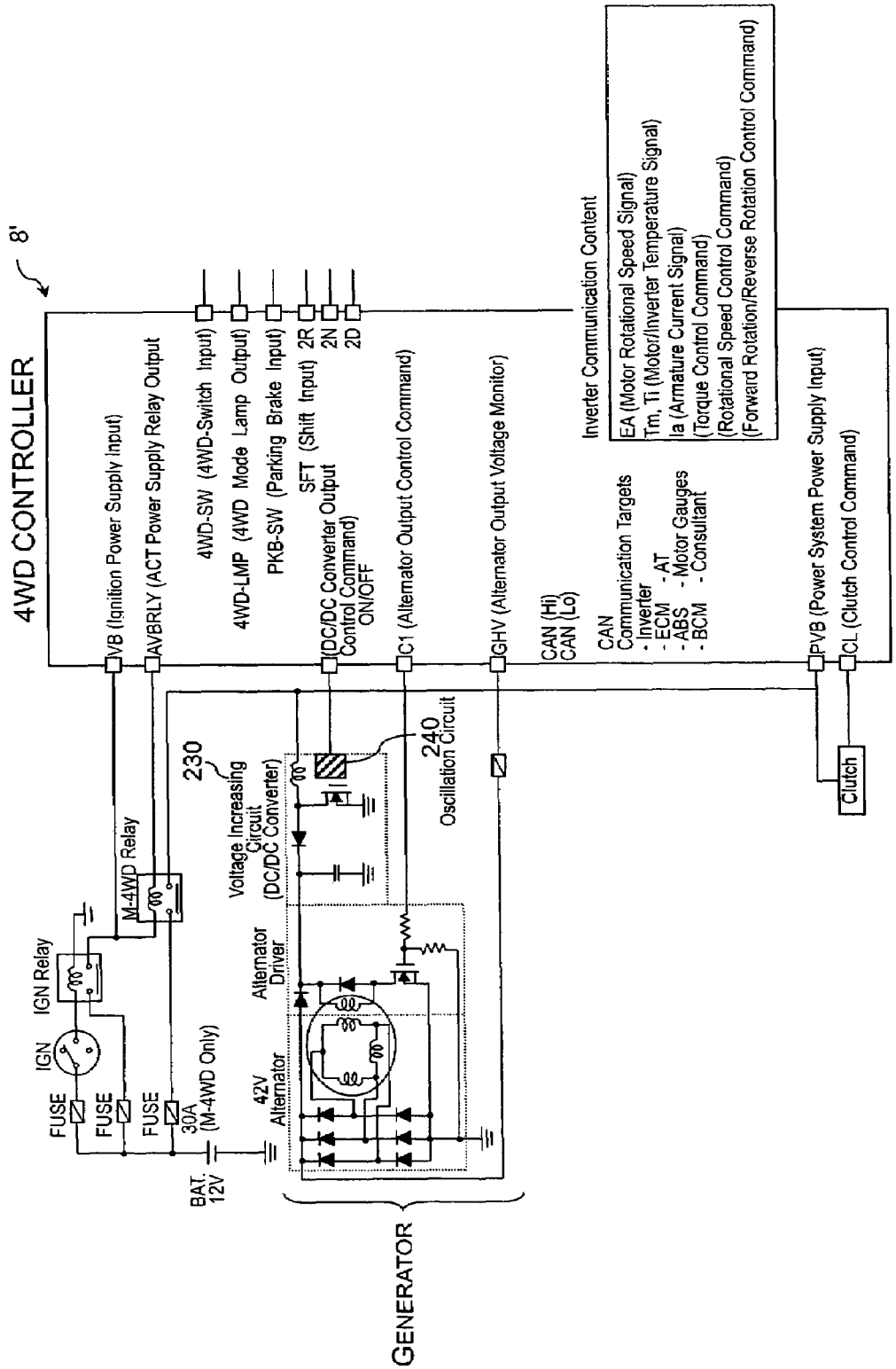
FIG. 6 is a system configuration diagram of a vehicle drive control device built into the 4WD controller in accordance with another embodiment of the present invention.

FIG. 6 is a system configuration diagram of a 4WD controller 8' with a vehicle drive control device in accordance with another embodiment of the present invention. As shown in FIG. 6, in this embodiment, a voltage increasing circuit 230 is built into the separate excitation line that is used by the 4WD controller 8' to control the generator field current. The 4WD controller 8' executes PWM on/off control of the oscillation circuit (transistor) 240 inside the voltage increasing circuit 230 (DC/DC converter) and thereby controls the amount of charge stored in the capacitor inside the voltage increasing circuit by variably controlling the voltage increase amount. Thus, the voltage supplied to the field coil inside the alternator driver can be variably controlled. When the PWM control of the 4WD controller 8' turns OFF the oscillation circuit 240, after the voltage stored in the capacitor of the voltage increasing circuit is consumed by the field coil, the generator resumes normal operation in which the voltage of the 12-volt vehicle power source is applied to the field coil through the coil inside the voltage increasing circuit.

Figure 7:
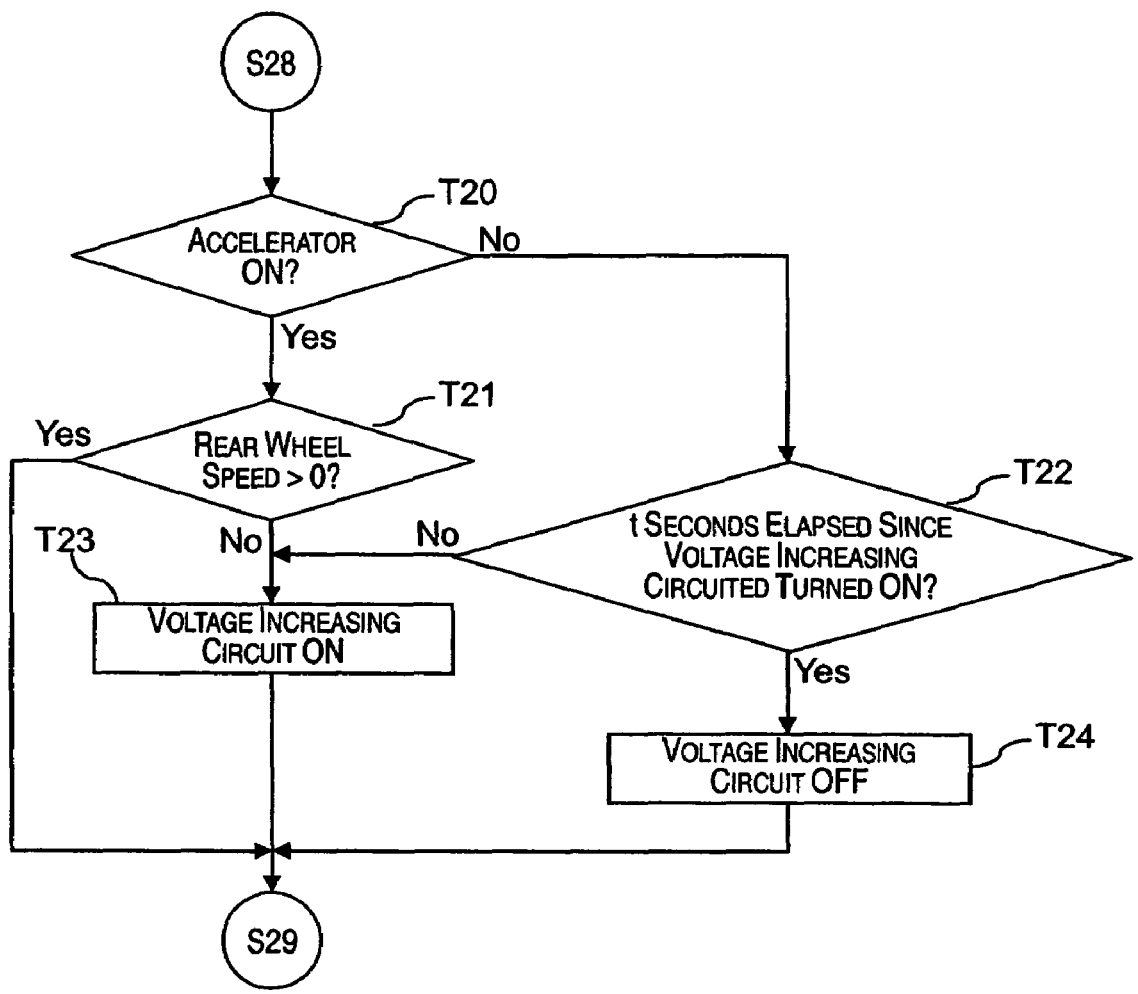
FIG. 7 is a flowchart showing an example of the processing executed by the 4WD controller in a case where a drive control device in accordance with the present invention has been built into the vehicle system shown in FIG. 1.

FIG. 7 is a flowchart presenting an example of the processing executed by the 4WD controller 8' in a case where a drive control device in accordance with the present invention has been built into the vehicle shown in FIG. 1. As shown in the FIG. 7, processing by the 4WD controller 8' in FIG. 7 is executed between steps S28 and S29 of FIG. 5.

In step T20, the 4WD controller 8' determines if the accelerator position is ON. The 4WD controller 8' proceeds to step T21 if the accelerator position is ON and to step T22 if the accelerator position is OFF. In step T21, the 4WD controller 8' determines if the rear wheel speed (i.e., the speed of the wheels driven by the motor) is greater than 0. If so, the 4WD controller 8' proceeds to step T23 and starts up the voltage increasing circuit. In step T22, the 4WD controller 8' determines if a prescribed amount of time t has elapsed since the voltage increasing circuit was turned on. If the prescribed amount of time t has elapsed, the 4WD controller 8' proceeds to step T24 and turns the voltage increasing circuit off. If not, the 4WD controller 8' proceeds to step T23.

Figure 8:
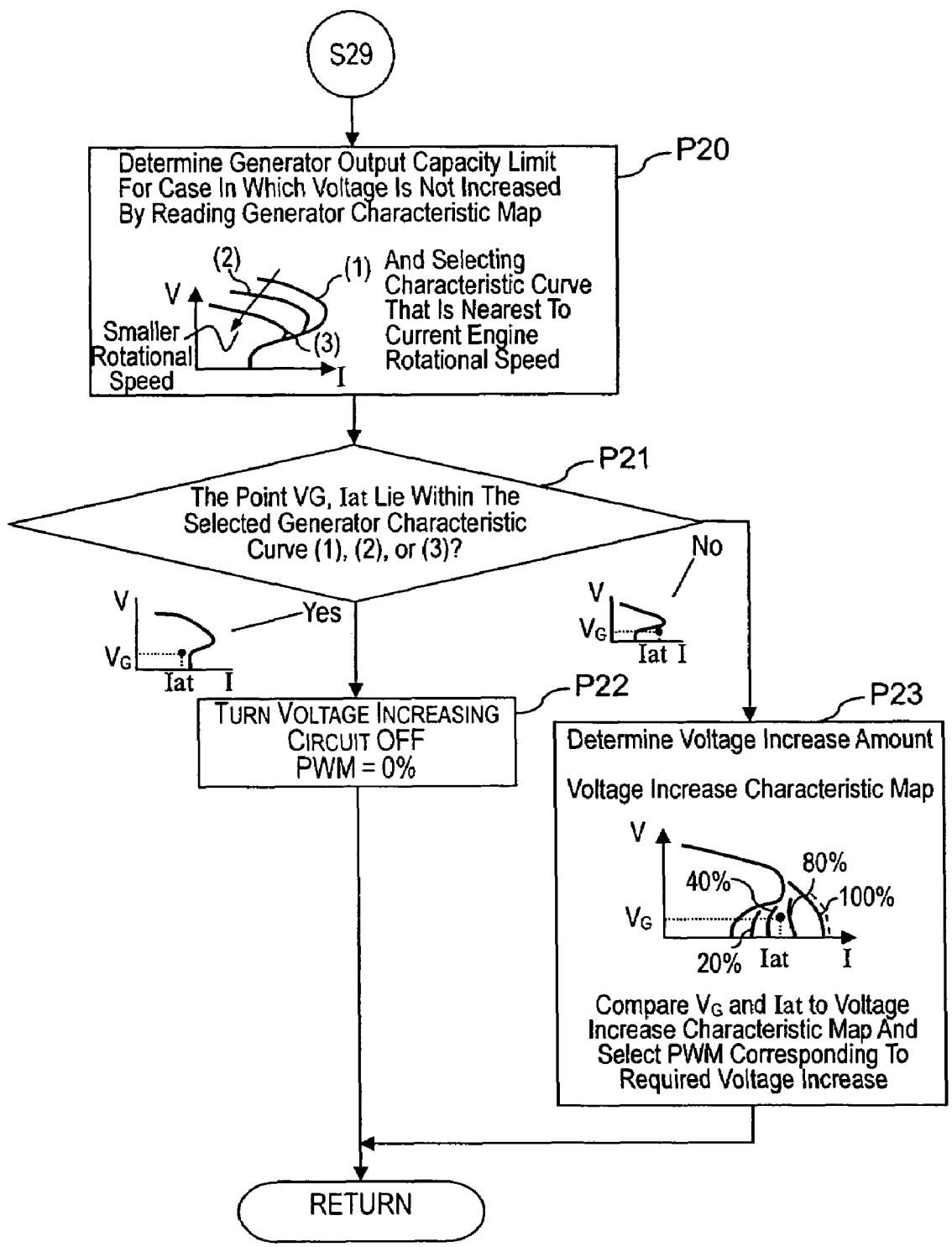
FIG. 8 is a flowchart showing a variation of the processing shown in FIG. 7.

FIG. 8 is a flowchart illustrating a variation of the processing shown in FIG. 7. As shown in the FIG. 8, the processing associated with this variation is executed between step S29 and Return of FIG. 5. In step P20, the 4WD controller 8' determines the generator output capacity limit for case in which voltage is not increased. More specifically, the 4WD controller 8' reads several generator maps or "characteristic curves" (like those shown in the figure) established based on different engine rotational speeds and selects the characteristic curve that is nearest to current engine rotational speed (in this example, the controller selects from among curves (1), (2), and (3)). In step P21, the 4WD controller 8' compares the point (VG, Iat) to the selected generator map and determines if the point lies within the map. If the point (VG, Iat) lies within the map, the 4WD controller 8' proceeds to step P22. If not, the 4WD controller 8' proceeds to step P23. In step P22, the 4WD controller 8' turns the voltage increasing circuit off by setting the pulse width modulation duty (PWM duty) to 0%. In step P23, compares voltage increasing characteristic maps to the point (VG, Iat), determines the required voltage increase, and selects the PWM duty corresponding to the required voltage increase. The 4WD controller 8' then operates the voltage increasing circuit designating the selected PWM duty.

Figure 9:
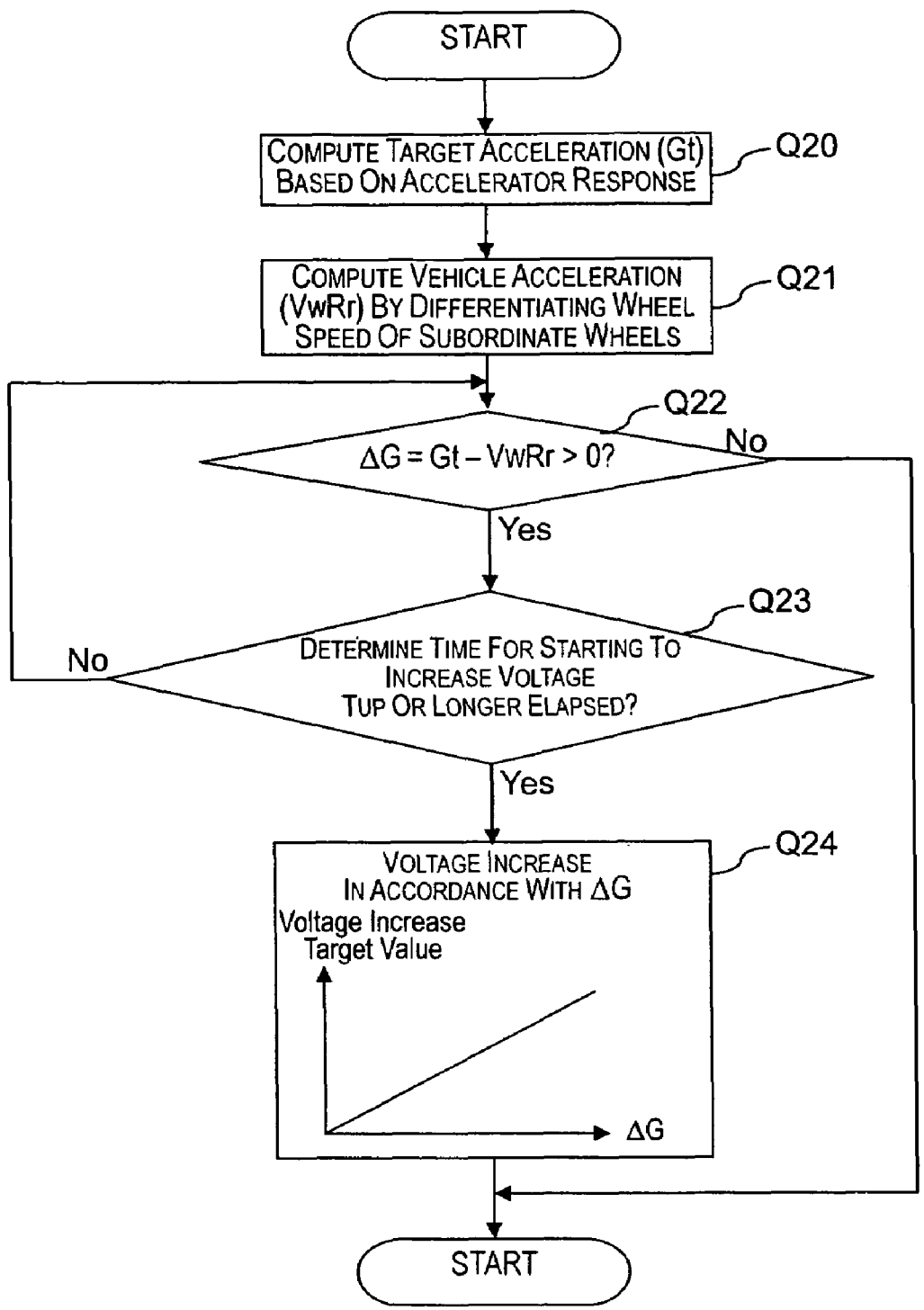
FIG. 9 is a flowchart showing another variation of the processing shown in FIG. 7.

FIG. 9 is a flowchart illustrating another variation of the processing shown in FIG. 7. In step Q20, the 4WD controller 8' computes the target acceleration Gt based on the accelerator response (e.g. depression amount, depression speed, etc.). In step Q21, the 4WD controller 8' computes the vehicle acceleration VwRr based on a differentiation value of the rotational speed trend of subordinate wheels (i.e., the wheels driven by the motor) using Equation (2) as follows.

$$\text{Vehicle acceleration} = VwRr \tag{2}$$

In steps Q22, the 4WD controller 8' determines if the deficiency of the actual acceleration ΔG given by Equation (3) is greater than 0 (i.e., if the acceleration of the vehicle is insufficient) as follows.

$$\Delta G = Gt - VwRr \tag{3}$$

If the actual acceleration ΔG is greater than 0, the 4WD controller 8' proceeds to step Q23. If not, the 4WD controller 8' ends the processing sequence. Even under normal circumstances, there is a delay between depressing the accelerator and the wheels actually starting to move. In order to prevent the unnecessary consumption of electric power which would result if the voltage increasing circuit were turned on too soon (and which would result in degraded fuel efficiency), in step Q23 the 4WD controller 8' sets an amount of time Tup for determining if it is time to start increasing the voltage and determines if this amount of time Tup has elapsed. If the time Tup has elapsed, the 4WD controller 8' proceeds to step Q24. If not, it proceeds to step Q22. In step Q24, the 4WD controller 8' uses a prescribed map to set a target voltage increase value corresponding to the actual acceleration deficiency ΔG and commences increasing the voltage.

More specifically, during acceleration from a stopped condition under normal circumstances, the vehicle can be accelerated with a small target motor torque and an acceleration matched to the amount by which the driver depresses the accelerator can be obtained without starting the voltage increasing circuit because the target generator voltage Vt is small and within the maximum output (Vlimit). With the present invention, the energy loss is reduced because the voltage is not increased under such circumstances. Meanwhile, when the vehicle is attempting to start into motion on a road that is covered with deep snow or has steep inclining slope, a large target motor torque is commanded and the target generator voltage Vt becomes large and exceeds the maximum output voltage (Vlimit) that can be delivered without increasing the voltage supplied to the field coil of the generator. Consequently, the vehicle cannot start into motion without increasing the field coil voltage of the generator. In such a situation, with the present invention, the voltage supplied to the field coil of the generator is increased by an amount corresponding to amount by which the target generator voltage Vt exceeds the maximum output voltage (Vlimit) and, as a result, the vehicle can be put into motion with the minimum required generator assistance. After the vehicle starts moving and the acceleration requested by the driver is reached, the voltage increasing circuit is stopped and the vehicle is allowed to travel with the normal capacity of the generator (i.e., the capacity it has without increasing the voltage supplied to the field coil). Thus, the present invention offers the following merits: it enables the use of a generator that is small in size and can therefore be mounted in the vehicle more easily; and the energy losses incurred are comparatively small and the degradation of the fuel efficiency is small because the voltage increasing circuit is controlled to provide the minimum required voltage increase even when the generator output becomes deficient under normal everyday circumstances.

Furthermore, whether the voltage increasing circuit is controlled based on the vehicle acceleration deficiency ΔGg or the generator output voltage deficiency ΔVg, the present invention offers the same merits as mentioned above. That is, it enables the use of a generator that is small in size and can therefore be mounted in the vehicle more easily; and the energy losses incurred are comparatively small and the degradation of the fuel efficiency is small because the voltage increasing circuit is controlled to provide the minimum required voltage increase when the generator output becomes deficient under normal everyday circumstances.

Figure 10:
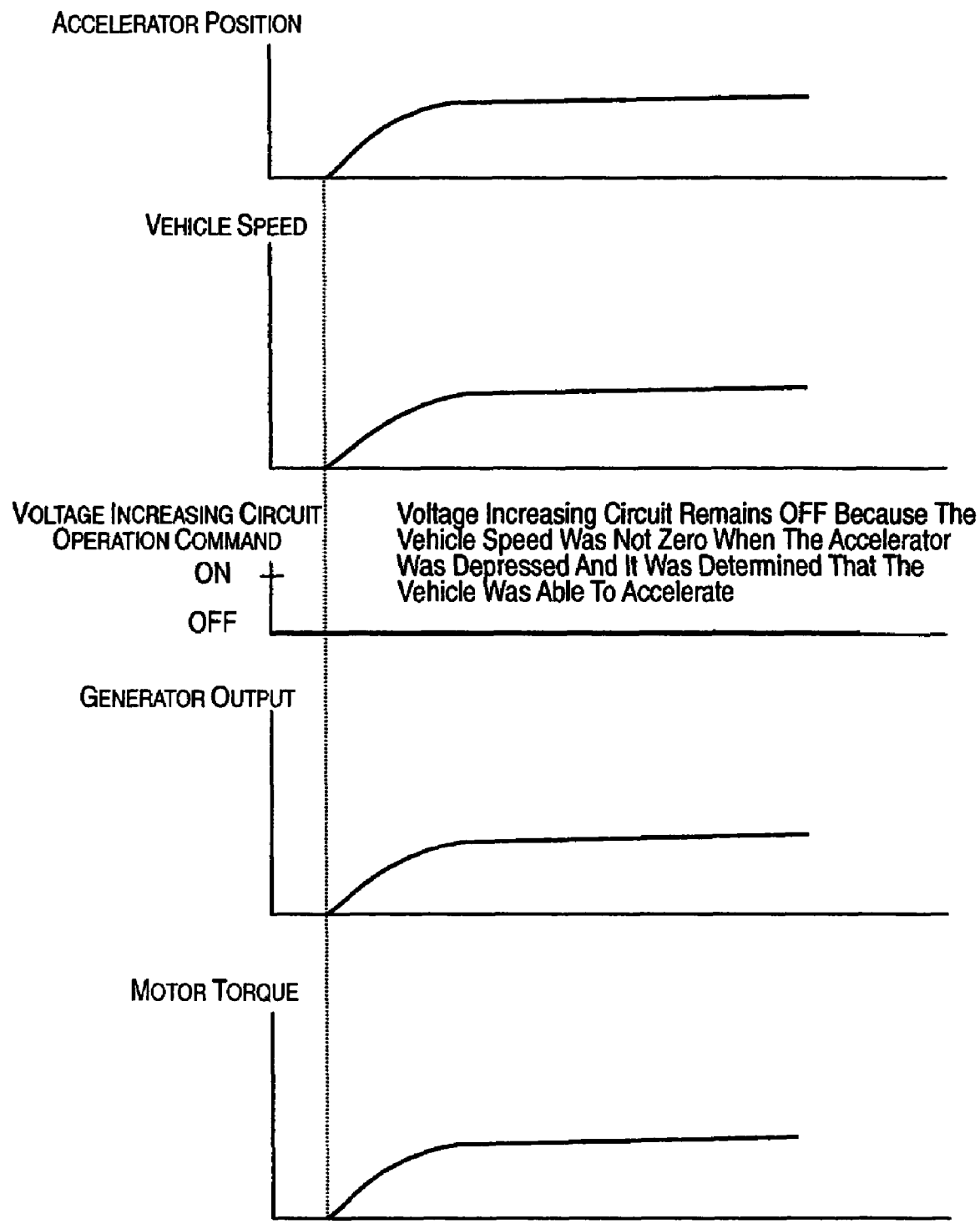
FIG. 10 is a time chart illustrating an example of the operation a vehicle drive control device in accordance with the present invention that has been built into a vehicle provided with a generator and in which the voltage increasing circuit is not being operated.

FIG. 10 is a time chart illustrating an example of the operation a drive control device in accordance with the present invention that has been built into a vehicle provided with a generator. FIG. 10 illustrates a case in which the voltage increasing circuit is not operated. As shown in the figure, the voltage increasing circuit operation command remains off and the voltage increasing circuit is not started when the vehicle speed steadily increases in accordance with the accelerator position and sufficient generator output and motor torque are generated.

Figure 11:
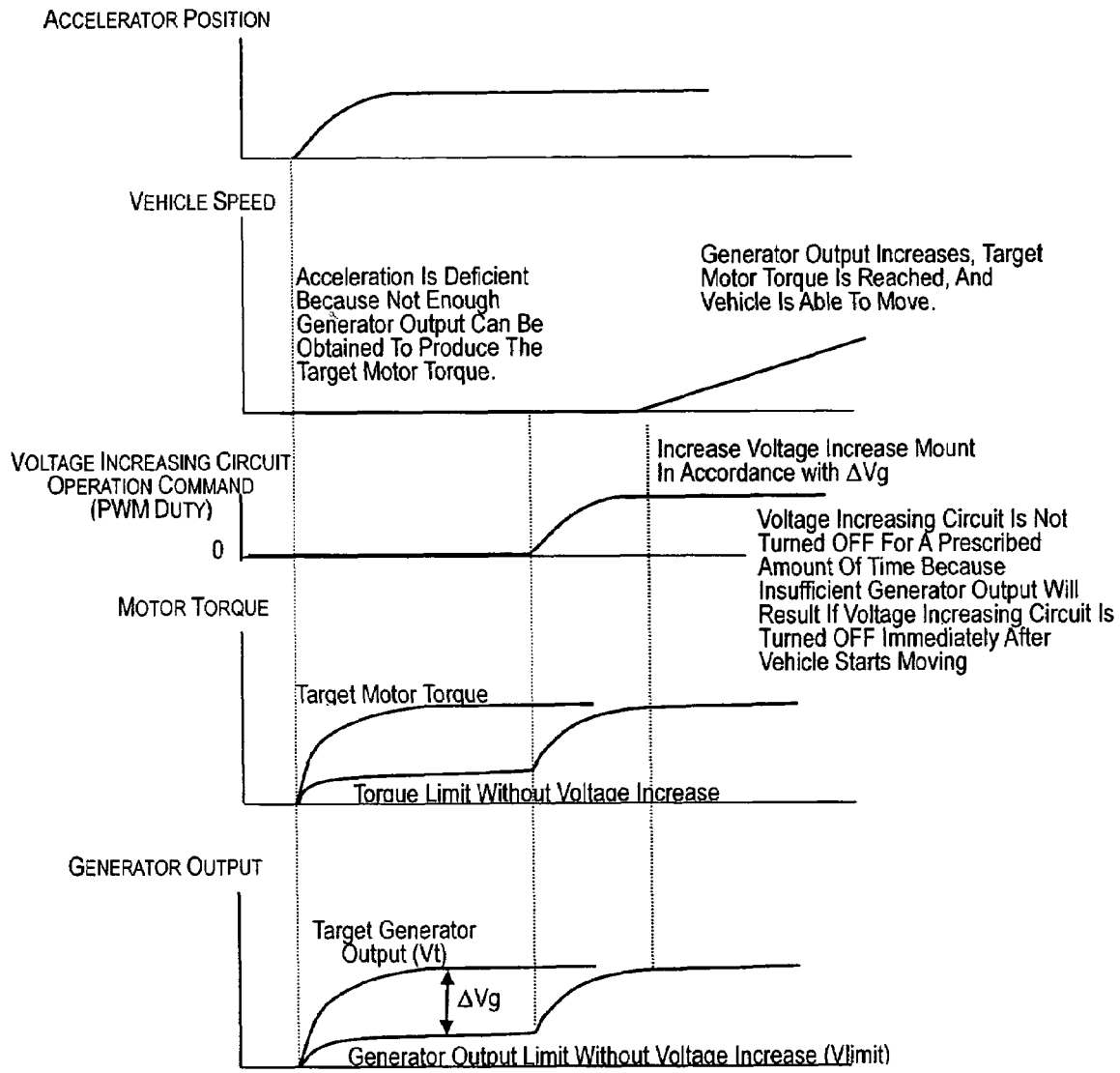
FIG. 11 is a time chart illustrating another example of the operation a drive control device in accordance with the present invention that has been built into a vehicle provided with a generator and in which the voltage increasing circuit is operated because the vehicle is in deep snow or on a steep slope or because the power from the generator and/or battery is small and it is necessary to increase the voltage from a normal everyday voltage.

FIG. 11 is a time chart illustrating another example of the operation a drive control device in accordance with the present invention that has been built into a vehicle provided with a generator. FIG. 11 illustrates a case in which the voltage increasing circuit is operated because the vehicle is in deep snow or on a steep slope or because the generator and/or battery is small and it is necessary to increase the voltage an a normal everyday basis. As shown in the figure, when vehicle speed does not rise in accordance with the accelerator position (i.e., when the vehicle cannot overcome the resistance load that opposes motion of the vehicle), the drive control device issues a voltage increasing circuit operation command (voltage increase amount command, i.e., PWM duty) based on the difference ΔVg between the target generator output voltage and the maximum generator output voltage (generator output limit) that can be obtained without increasing the generator field voltage. In response to the operation command, the voltage increasing circuit increases the voltage by the minimum amount required and thereby eliminates the generator output deficiency. Or, if the drive control device is configured to execute on/off control of the voltage increasing circuit, the drive control device sets the value of the voltage increasing circuit operation command to ON and, in response, the voltage increasing circuit operates and eliminates the generator output deficiency so that the vehicle can start moving.

Figure 12:
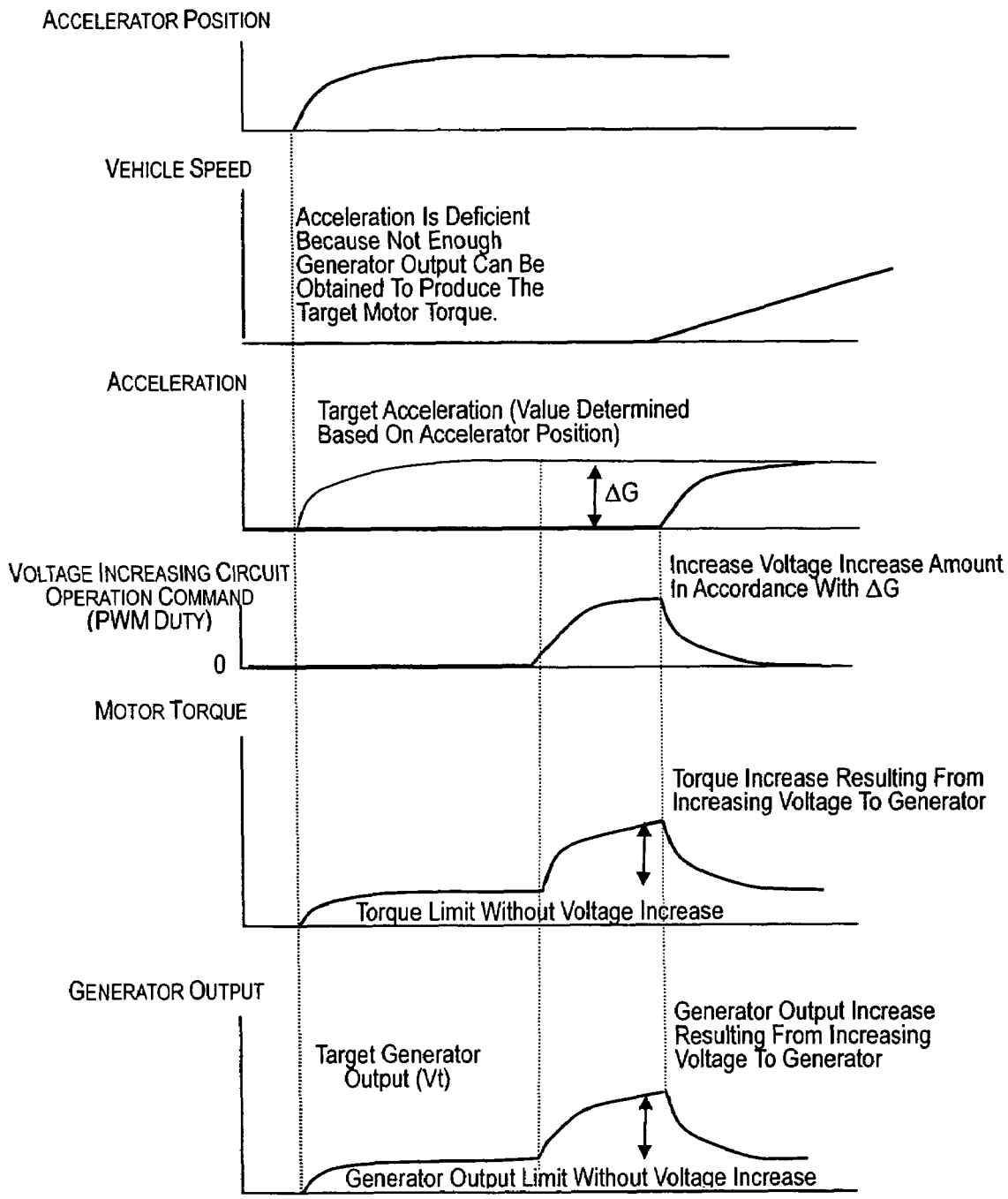
FIG. 12 is a time chart illustrating another example of the operation a vehicle drive control device in accordance with the present invention that has been built into a vehicle provided with a generator.

Although FIG. 11 illustrates a case in which the voltage increase amount is controlled based on the difference between the target generator output and the actual generator output, it is also acceptable control the voltage increase amount based on the difference between the target acceleration and the actual acceleration. Such a case is illustrated in FIG. 12, which is also a time chart illustrating an example of the operation a drive control device in accordance with the present invention that has been built into a vehicle provided with a generator. As shown in the figure, when vehicle speed does not rise in accordance with the accelerator position (i.e., when the vehicle cannot overcome the resistance load that opposes motion of the vehicle), the drive control device issues a voltage increasing circuit operation command (voltage increase amount command, i.e., PWM duty) based on the difference ΔG between the target acceleration (which is a value computed based on the accelerator position) and the actual acceleration. In response to the operation command, the voltage increasing circuit increases the voltage by the minimum amount required and thereby eliminates the generator output deficiency.

Figure 13:
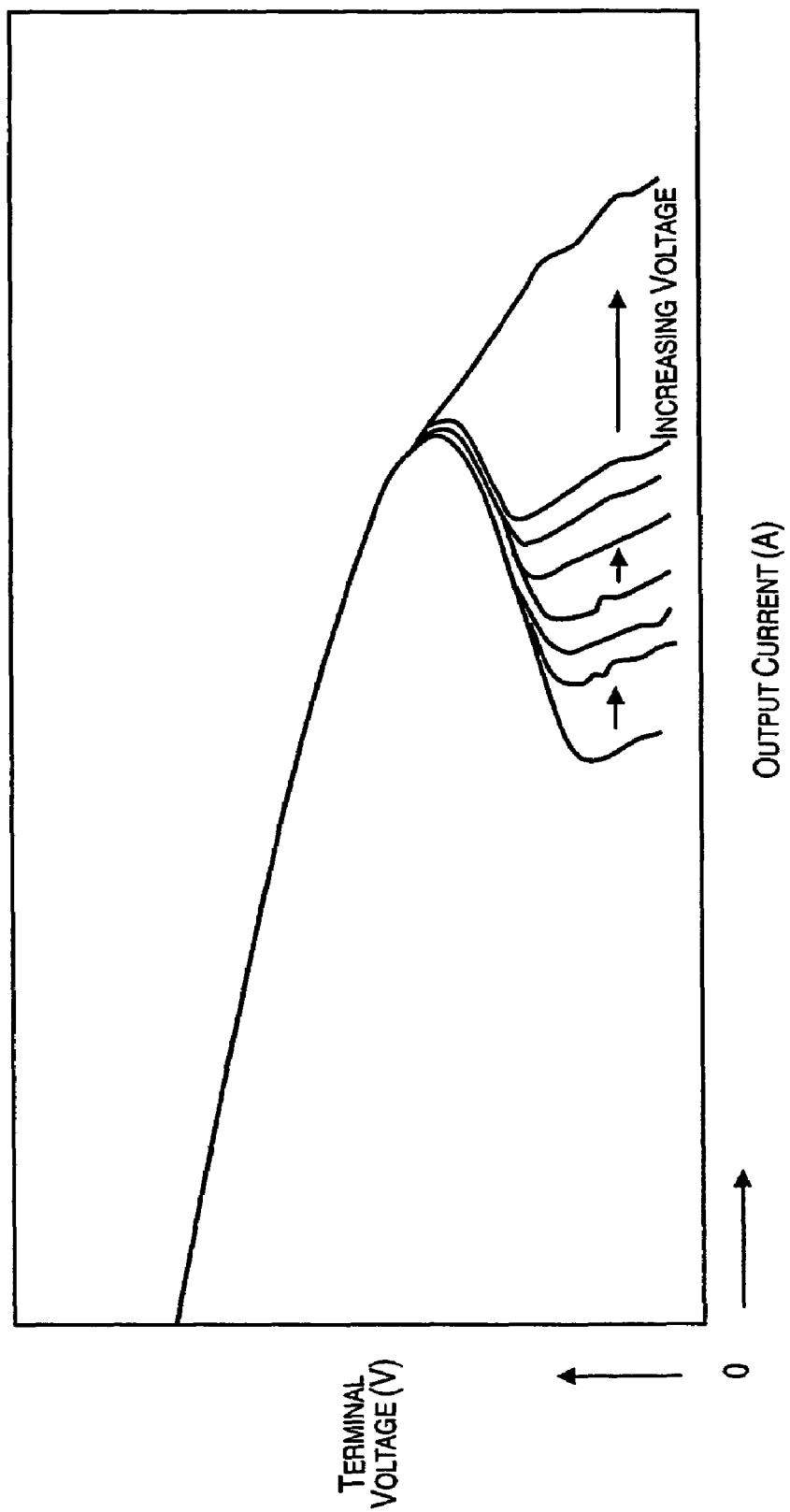
FIG. 13 is a graph of the output current value of a generator when a voltage that has been increased by a vehicle drive control device in accordance with the present invention is applied to the field coil of the generator.

FIG. 13 shows the output current value of a generator when a voltage that has been increased by a vehicle drive control device in accordance with the present invention is applied to the field coil of the generator. As shown in the figure, the more the voltage is raised by the voltage increasing circuit, the larger the output current of the generator can be. For example, in a case where only approximately 180 amperes can be obtained with the low voltage that is normally available when the vehicle is starting into motion, a generator output of 290 amperes can be obtained if voltage is raised to 20 volts. Since the motor torque is proportional to the current, the torque can be variably controlled in such a manner as to be increased by up to a factor of 1.6 (290/180=1.6).

In the vehicle drive control device of the present invention, the voltage increasing section (circuit) is configured to increase the voltage supplied to the electric generator (self-excited field coil or separately excited field coil) from a vehicle mounted electric power source (e.g., a battery, a capacitor, or a fuel cell) when the determining section determines that the actual acceleration is deficient. Thus, with the present invention, the voltage supplied to the field coil of the electric generator can be increased (e.g., higher than the normal battery voltage of 12 volts), thereby increasing the current in the field coil and increasing the magnetic flux generated by the field coil. As a result, even though neither the quantity nor the strength of the field magnets has been increased, the output capacity of the generator can be increased in the same manner as if the quantity or strength of the magnets had been increased. Thus, since an appropriate motor torque in accordance with the acceleration requested by the driver can be obtained, the problem of insufficient torque when starting into motion from a stopped condition can be eliminated and the driver's control over the vehicle can be improved. Furthermore, the generator output can be increased without increasing the size of the electric generator or otherwise making the electric generator more difficult to mount in the vehicle. The voltage increasing circuit can be mounted in a space that is separated from where the electric generator is mounted and so that the space surrounding the engine is not disturbed by measures taken to improve the output performance of the electric generator.

Additionally, with the present invention, when the four-wheel drive system is configured to increase the voltage of the vehicle power source (battery) and use that increased voltage as the power supply to the field coil of the generator, such as when the electric generator is a separately excited generator (i.e., a generator in which the field coil is excited using an external power source), the amount of voltage increase can be controlled in a variable manner. Since the voltage increasing circuit uses the energy of a vehicle mounted power source in order to increase the voltage, if the voltage is increased constantly the vehicle power source will become depleted and the service life of the power source will be shortened. Additionally, energy losses will be incurred and the fuel efficiency will decline. However, since the present invention is provided with a determining section, the system can be controlled such that the voltage is not increased during normal acceleration from a stop and normal driving conditions and is only increased when a large drive output is required. Thus, in comparison with simple on/off control of the voltage increasing function, the consumption of energy can be optimized and the degradation of the fuel efficiency can be minimized.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-423436. The entire disclosure of Japanese Patent Application No. 2003-423436 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive control device comprising:
    a vehicle electric power source configured to supply a voltage to a field coil of an electric generator;
    an generator output voltage controlling section configured to adjust a field current flowing through the field coil of the electric generator to control an output voltage generated by the electric generator;
    a determining section configured to determine if an actual vehicle acceleration is deficient in comparison with a requested acceleration amount based on an acceleration operation by a driver; and
    a generator voltage increasing circuit operatively coupled to the vehicle electric power source and the electric generator, and configured to increase the voltage supplied from the vehicle electric power source to the field coil of the electric generator so that a field coil voltage of the electric generator becomes higher than a voltage of the vehicle electric power source upon a determination by the determining section that the actual vehicle acceleration is deficient in comparison with the requested acceleration amount.

2. The drive control device as recited in claim 1, wherein the generator voltage increasing circuit is further configured to increase the field coil voltage by an amount that is based on a difference between a generator output quantity corresponding to a target motor torque and a maximum generator output quantity that the electric generator can produce without increasing the field coil voltage.

3. The drive control device as recited in claim 1, wherein the generator voltage increasing circuit is further configured to increase the field coil voltage by an amount that is based on a difference between the requested acceleration amount and the actual vehicle acceleration.

4. The drive control device as recited in claim 1, wherein the generator voltage increasing circuit is further configured to increase the field coil voltage by an amount that is based on a difference between the requested acceleration amount and a vehicle acceleration that can be obtained with a motor torque that can be obtained with a maximum generator output that the electric generator can produce without increasing the field coil voltage.

5. The drive control device as recited in claim 1, further comprising
    an acceleration computing section configured to compute the requested acceleration amount based on one of an accelerator position and a throttle opening amount.

6. The drive control device as recited in claim 1, further comprising an actual acceleration detecting section configured to compute the actual vehicle acceleration based on a signal indicative of the actual vehicle acceleration.

7. The drive control device as recited in claim 1, further comprising a generator output computing section configured to compute an output of the electric generator.

8. The drive control device as recited in claim 1, wherein the vehicle electric power source is further configured to supply electric power to an electric motor that drives a vehicle wheel.

9. The drive control device as recited in claim 1, wherein

The generator voltage increasing circuit is further configured to increase the field coil voltage in a variable manner.

10. The drive control device as recited in claim 1, further comprising a main drive source configured and arranged to drive a main drive wheel and the electric generator.

11. The drive control device as recited in claim 1, further comprising an electric motor configured and arranged to drive a subordinate drive wheel from electric power generated by the electric generator.

12. The drive control device as recited in claim 10, further comprising an electric motor configured and arranged to drive a subordinate drive wheel from electric power generated by the electric generator.

13. The drive control device as recited in claim 12, wherein the vehicle electric power source is further configured to supply electric power to the electric motor.

14. The drive control device as recited in claim 12, wherein the generator voltage increasing circuit is further configured to increase the field coil voltage by an amount that is based on a difference between a generator output quantity corresponding to a target motor torque and a maximum generator output quantity that the electric generator can produce without increasing the field coil voltage.

15. The drive control device as recited in claim 12, wherein the generator voltage increasing circuit is further configured to increase the field coil voltage by an amount that is based on a difference between the requested acceleration amount and the actual vehicle acceleration.

\* \* \* \* \*